United States Patent [19]
Urbach et al.

[11] 3,980,498
[45] Sept. 14, 1976

[54] ELECTROCHEMICAL CELL USING LITHIUM-ALUMINUM ALLOY ANODE AND AQUEOUS ELECTROLYTE

[75] Inventors: Herman B. Urbach, Annapolis; David E. Icenhower, Glen Dale; Mark C. Cervi, Severna Park; Robert J. Bowen, Annapolis, all of Md.

[73] Assignee: The United States of America as represented by the Secretary of the Navy, Washington, D.C.

[22] Filed: June 25, 1974

[21] Appl. No.: 482,980

[52] U.S. Cl. .................... 429/64; 429/72; 429/81; 429/90; 429/119; 429/120; 429/159; 429/246
[51] Int. Cl.² ............... H01M 4/40; H01M 6/00
[58] Field of Search .......... 136/86 A, 83 R, 159, 136/161

[56] References Cited
UNITED STATES PATENTS

| | | | |
|---|---|---|---|
| 3,012,087 | 12/1961 | Billard et al. | 136/161 |
| 3,294,587 | 12/1966 | Le Duc | 136/86 A |
| 3,645,792 | 2/1972 | Hacha | 136/83 R |

*Primary Examiner*—John H. Mack
*Assistant Examiner*—H. A. Feeley
*Attorney, Agent, or Firm*—R. S. Sciascia; Q. E. Hodges; D. McGiehan

[57] ABSTRACT

An electrochemical cell exhibiting high specific power and specific energy in combination which comprises an aluminum-lithium alloy anode with an aqueous electrolyte. The electrolyte may be the readily available seawater circulated through the cell at a predetermined flowrate to obtain maximum controlled electrical energy output.

3 Claims, 2 Drawing Figures

ELECTROCHEMICAL CELL USING LITHIUM-ALUMINUM ALLOY ANODE AND AQUEOUS ELECTROLYTE

The invention described herein may be manufactured and used by or for the Government of the United States of America for governmental purposes without the payment of any royalties thereon or therefor.

BACKGROUND OF THE INVENTION

The instant invention relates generally to voltaic and electrochemical cells and more particularly to a cell using a lithium-aluminum alloy anode and an aqueous electrolyte.

Lithium and other light metals of groups IA and IIA of the periodic table are attractive candidates for voltaic cell anodes because of their light weight and high position in the electrochemical series. The prior art shows many cells involving such light metals and also alloys of aluminum and lithium. However the cells using a lithium-aluminum alloy anode conventionally use fused salt or other non-aqueous electrolytes including the alkali metal halides, alkaline earth metal halides, and molten electrolytes based on aluminum chloride.

Electrochemical cells based on the use of lithium or aluminum anodes and an aqueous electrolyte have been proposed, but have not been successful. One important consideration is the energy-volume ratio of the cell system. Theoretically a lithium system would produce 130 kw-hr/ft$^3$, and an aluminum system would produce 520 kw-hr/ft$_3$. However, an aluminum anode is relatively inactive in pH-neutral water at room temperature so the power could not be achieved. The lithium anode is too reactive with aqueous electrolytes and may be too uncontrollable for use in a cell.

The use of oxygen instead of water as the oxidant electrolyte in these aluminum or lithium anode fuel cells yields a higher output potential and energy. However in portable applications, the portage of oxygen and its containment vessels results in lesser power-to-weight and volume ratios than is obtainable from a system using available water as an electrolyte.

SUMMARY OF THE INVENTION

Accordingly, an object of the instant invention is to provide a new and improved electrochemical cell system for producing electrical energy by chemical reaction.

Another object of the present invention is to provide a cell for producing controlled high electrical energy output without much space and weight penalty.

Still another object of the instant invention is to provide an electrochemical cell for producing electrical energy using a lithium-aluminum alloy anode in an aqueous electrolyte.

A further object of the present invention is to provide a seawater cell using an anode and cathode combination capable of efficient operation with available seawater.

A still further object of the present invention is to provide a cell capable of deferred operation and a long shelf-life.

Briefly, these and other objects of the instant invention are attained by the use of an electrochemical cell having a lithium-aluminum alloy anode, a suitable cathode, and an aqueous electrolyte, such as available seawater. The cell is a liquid tight package having an electrolyte inlet and outlet for circulating the electrolyte. The electrochemical cells are combined to form a stack and electrically interconnected to provide higher voltage and current output. An electrolyte circulation system, including a pump, reservoir, temperature controller, heat exchanger, and waste filters is connected to the stack.

BRIEF DESCRIPTION OF THE DRAWING

A more complete understanding of the invention and many of the attendant advantages thereof will be readily appreciated as the same become better understood by reference to the following detailed description when considered in connection with the accompanying drawing wherein.

DESCRIPTION OF THE PREFERRED EMBODIMENT

Figure 1:
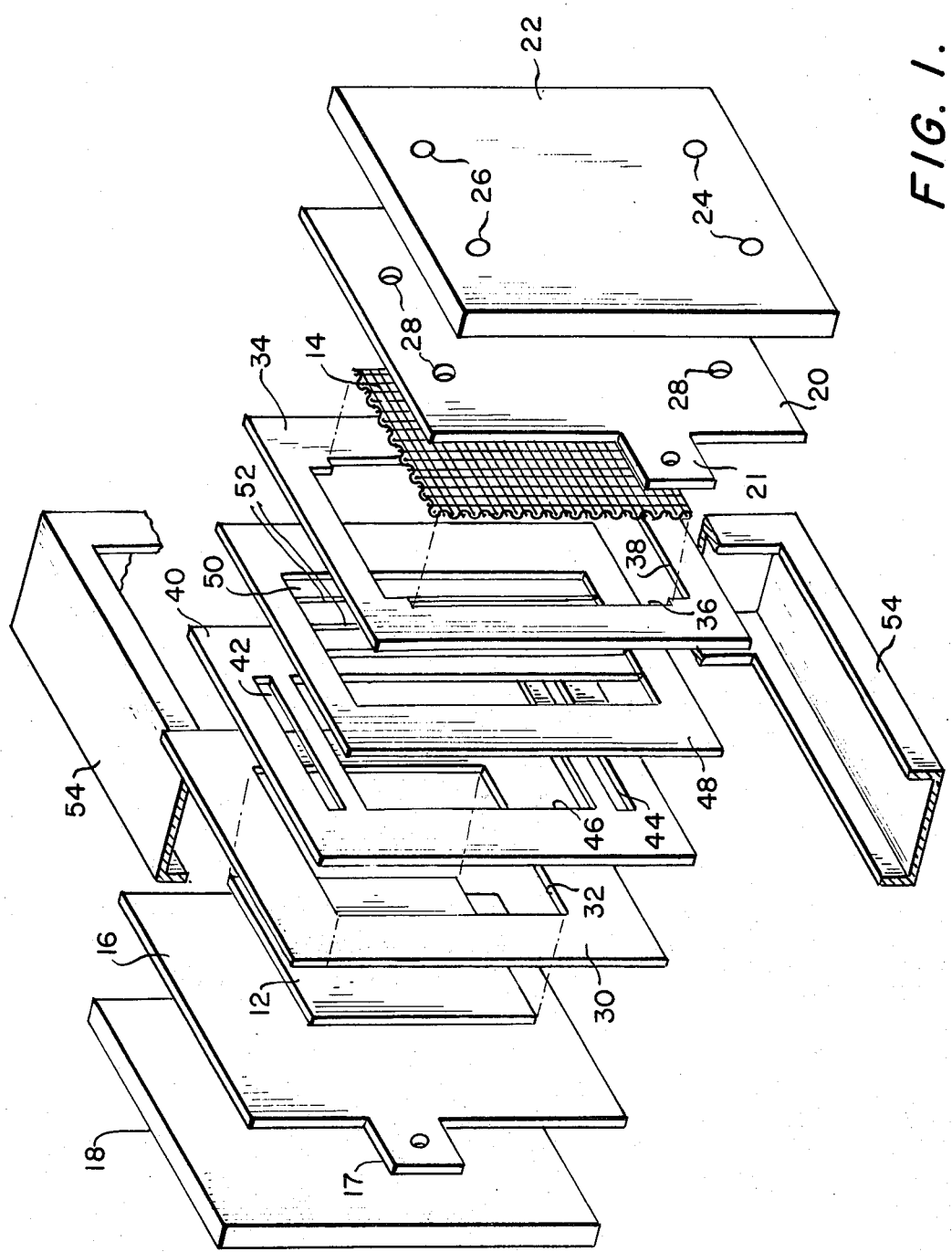
FIG. 1 is an exploded perspective view of the cell.

Referring now to the drawings, wherein like reference numerals designate corresponding parts throughout the several views, there is shown generally in FIG. 1 a single electrochemical cell 10 having an anode 12 made of a lithium-aluminum alloy and a cathode 14, made of a ferrous metal screen material for example, or other conductive material having a large surface area. The composition of the lithium-aluminum alloy is not particularly critical, and the percentage of lithium may range from 10% to 50% with aluminum the remainder. The anode is consumed in the electrochemical reaction.

The cell 10 may be of laminated construction as follows. Outside the anode 12 is an anode current collector 16 that electrically contacts the anode and has a tab 17 for electrical output connection. Outside the screen 16 is a back up plate 18 which forms the sealing end plate of the cell and is made of a non-conductor. Similarly, outside the cathode 14 is a cathode collector 20 that electrically contacts the cathode, and has a tab 21 for electrical output connection. Outside the cathode collector is another backup plate 22 made of a non-conducting material. A set of electrolyte inlet ports 24 are formed near the bottom and a set of electrolyte effluent outlet ports 26 are formed near the top of the cell. The cathode collector 20 also has two sets of fluid passages 28 in register with the ports 24 and 26 for electrolyte to flow.

Due to FIG. 1 being an exploded perspective view the orientation of some elements shown between the anode and cathode are not immediately evident. For example an anode spacer 30, surrounds the edges of the anode 12 much like a frame and is made of a non-conducting material. An aperture 32 in the anode spacer 30 may exactly fit the edges of the anode 12 yet allow the circulation of electrolyte. A cathode spacer 34 made of a non-conductor surrounds the cathode 14 in a similar framing manner; however, an aperture 36 is specially notched at the corners to provide slot passages 38 at the top and bottom of cathode 14 when framed. Centrally between the anode spacer 30 and the cathode spacer 34 is an electrolyte manifold plate 40 for channeling the circulating electrolyte in a desired path. The manifold plate 40 is made of a non-conductor and has a top slot 42 and a bottom slot 44 for conducting the influx and outflux of the electrolyte and a large rectangular opening 46 at the center forming the ionization path between the anode 12 and the cathode 14. A separator 48 having a rectangular opening 50 and a plurality of vertical bars 52 for support purposes separates the cathode spacer 34 from the electrolyte manifold 40 and is made of a non-conductor. As previously discussed FIG. 1 is an exploded perspective view, and actually all the elements of the electrochemical cell 10 are compressed and sealed about their edges by a clamp ring 54 (portion shown) or any other suitable edge clamping means.

Figure 2:
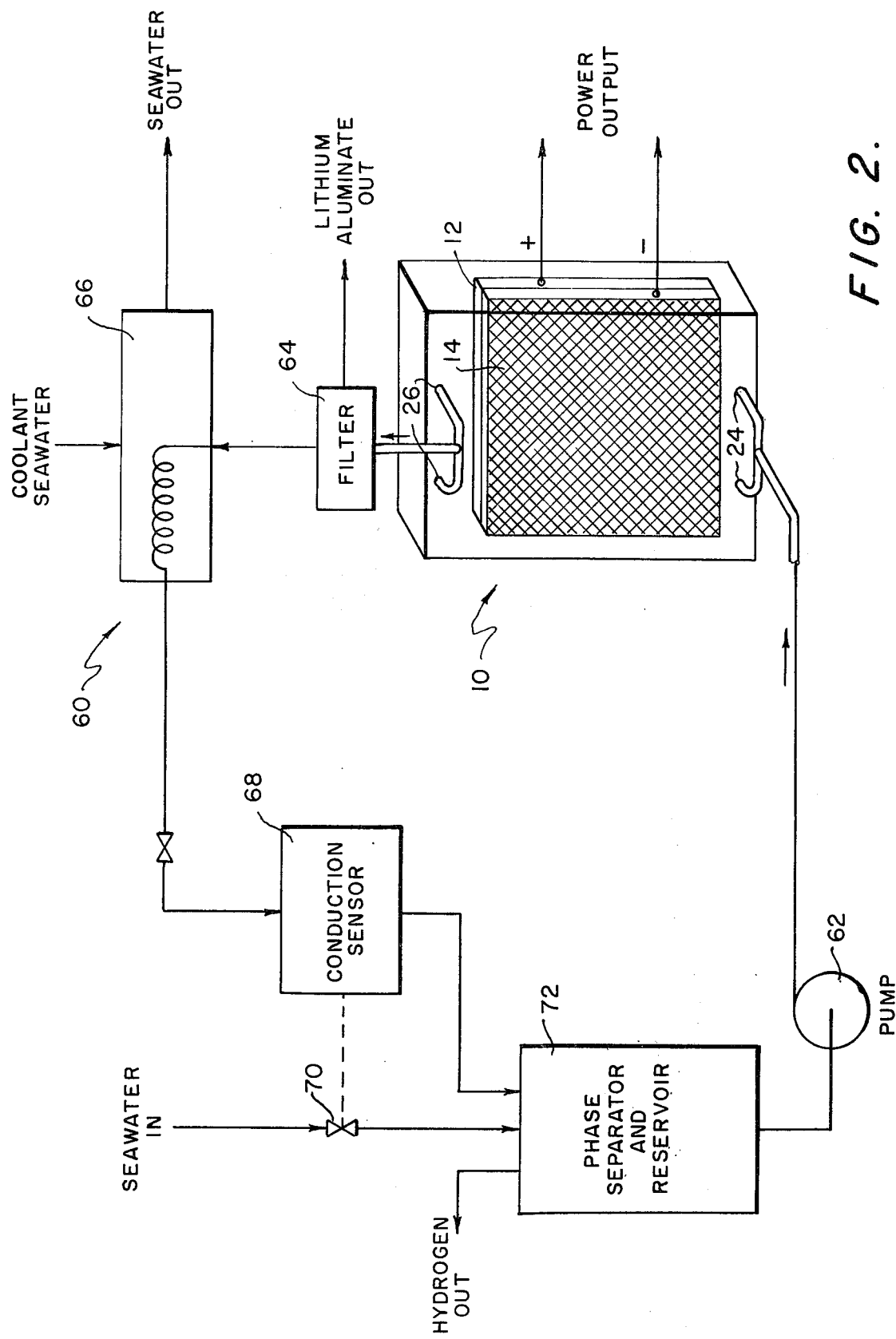
FIG. 2 is a schematic diagram of the electrochemical cell and electrolyte circulating system according to the invention.

Referring now to FIG. 2, a schematic representation of the electrochemical cell 10 is shown connected to an electrolyte circulation system 60, also shown in schematic form. A pump 62 supplies electrolyte to the cell 10 through the electrolyte inlet ports 24. The electrolyte which is aqueous and may be fresh or sea-water or the like, circulates through the cell 10 in the passages and slots discussed above in regard to FIG. 1. It then exits out the electrolyte effluent ports 26 at the top of the cell and is conducted to a filter 64 where the insoluable lithium-aluminate waste is extracted. The filtered electrolyte then enters a heat exchanger 66 where the chemical reaction heat is removed by coolant seawater or the like. The electrolyte, having its temperature precisely fixed, is fed to a conductivity sensor 68 which monitors the hydroxide concentration. The sensor 68 is electrically connected to a metering valve 70 which controls the input of makeup sea-water into the system to maintain a predetermined level of hydroxide concentration. The recirculated electrolyte is diluted with the makeup seawater in a reservoir and phase separator 72, where hydrogen gas is evolved and exhausted to the atmosphere. The reprocessed electrolyte and makeup seawater, now suitably filtered, temperature controlled, conductivity controlled, and separated from its waste products is conducted to the input of the pump 62, which recirculates the electrolyte into the cell 10 again. As the primary object of the invention, electrical energy is produced between the anode tab 17 and the cathode tab 21 derived from electrochemical reaction of a lithium-aluminum anode and an aqueous electrolyte.

Obviously, many modifications and variations of the present invention are possible in light of the above teachings. It is therefore to be understood that within the scope of the appended claims, the invention may be practiced otherwise than as specifically described.

What is claimed is:

1. An electrochemical cell comprising:
   an anode made of a lithium-aluminum alloy wherein the amount by weight of lithium is in the range of 15–35 percent;
   a cathode made of a ferrous metal;
   an aqueous seawater electrolyte circulated between said anode and cathode; and
   an electrolyte recirculation system capable of eliminating the waste products of the cell and consumable anode.

2. The electrochemical cell of claim 1 wherein said electrolyte recirculation system comprises:
   a circulating pump connected to the electrolyte input ports of said cell;
   a filter connected to the electrolyte outlet ports of said cell for removing lithium aluminate from the discharged electrolyte;
   a heat exchanger connected to the output of the filter for precisely controlling the electrolyte temperature;
   a conductivity sensor connected to the output of said heat exchanger for monitoring the hydroxide concentration of the electrolyte;
   a metering valve electrically connected to said conductivity sensor for metering an amount of makeup seawater into the recirculated electrolyte to maintain a predetermined hydroxide concentration level; and
   a phase separator and reservoir connected to said conductivity sensor and said metering valve and the input of said pump for evolving and eliminating hydrogen from the electrolyte electrochemical reaction.

3. An electrochemical cell having a laminated structure comprising:
   a lithium-aluminum alloy anode in the form of a porous plate;
   a non-conductive anode frame surrounding the edges of said anode;
   a non-conductive separator forming a layer against said anode and having a plurality of apertures;
   a ferrous metal cathode in the form of a plate laid against said separator;
   a non-conductive cathode frame surrounding the edges of said cathode;
   electrical contact means separately connected to said anode and to said cathode;
   a pair of backup plates, one on each end and outside of said laminated structure;
   clamp means for compressing and sealing the cell into a unitary structure;
   an aqueous seawater electrolyte;
   an electrolyte manifold made of non-conductive material laminated against said separator;
   a set of electrolyte imput ports in one of said backup plates; and
   a set of electrolyte effluent output ports in one of said backup plates.

* * * * *